United States Patent [19]

Miyano

[11] 4,417,118
[45] Nov. 22, 1983

[54] AUTOMATIC WIRE-SETTING OR -RESETTING METHOD AND APPARATUS IN A TRAVELING-WIRE ELECTROEROSION MACHINE

[75] Inventor: Kastuyoshi Miyano, Kawasaki, Japan
[73] Assignee: Japax Inc., Kawasaki, Japan
[21] Appl. No.: 287,043
[22] Filed: Jul. 27, 1981
[30] Foreign Application Priority Data
  Jul. 28, 1980 [JP] Japan .................................. 55-102423
[51] Int. Cl.³ .............................................. B23P 1/12
[52] U.S. Cl. ................................ 219/69 W; 219/69 V; 219/69 M
[58] Field of Search ................ 219/69 W, 69 M, 69 R, 219/68, 69 V; 204/129.6, 129.7; 226/91

[56] References Cited
U.S. PATENT DOCUMENTS
  4,205,213  5/1980 Inoue .................................. 219/69 W
  4,242,559 12/1980 Roemes et al. .................... 219/69 W FOREIGN PATENT DOCUMENTS
  51-15897  2/1976 Japan .............................. 219/69 W
  695795   11/1979 U.S.S.R. ........................... 219/69 W Primary Examiner—M. H. Paschall
Attorney, Agent, or Firm—Karl F. Ross; Herbert Dubno

[57] ABSTRACT

A method of and an apparatus for automatically setting or resetting a machining-electrode wire on an operating set-up on a traveling-wire electroerosion machine wherein a broken free end portion of the electrode wire is vibrated with a small amplitude while being advanced along a straight line path for the electrode wire defined between a pair of guide members and with which a preformed starting through-hole in the workpiece is located in alignment. This allows a smooth and non-encumbered threading of the flexible electrode wire which has little self-supporting ability through the starting through-hole.

16 Claims, 2 Drawing Figures

AUTOMATIC WIRE-SETTING OR -RESETTING METHOD AND APPARATUS IN A TRAVELING-WIRE ELECTROEROSION MACHINE

FIELD OF THE INVENTION

The present invention relates to a new and improved method of and apparatus for automatically setting and-/or resetting a machining-electrode wire in an operating set-up on a traveling-wire electroerosion machine.

The term "electroerosion" used herein is intended to refer broadly to the process of electrical machining in general, including electrical discharge machining (EDM), electrochemical machining (ECM) and electrochemical-discharge machining (ECDM).

The term "electrode wire" used herein is intended primarily to refer to an elongated electrode in the form of a thin continuous wire, but may include any other similar form of elongated electroerosion electrode such as a tape form.

The invention particularly concerns a method of and an apparatus for automatically threading or passing such a continuous electrode wire through a workpiece on an electroerosion machine.

BACKGROUND OF THE INVENTION

In the travelling-wire electroerosion machine, the continuous electrode wire is axially transported from a supply means to a takeup means. In the path of wire travel, a pair of machining guide members are commonly disposed at opposite sides of the workpiece to define a straight line path therebetween for the transported electrode wire. The latter is thus tightly stretched across the guide members while axially traveling continuously and traversing the workpiece and the guide members serve to position the electrode wire in a machining relationship with the workpiece. The machine further includes a power supply for passing an electrical machining current, typically in the form of a succession of pulses, between the electrode wire and the workpiece across a machining gap flooded with a machining liquid, e.g. water, to electroerosively remove process from the workpiece. As the material proceeds, the workpiece is displaced transversely relative to the axis of the electrode wire along a prescribed feed path under the command, preferably, of a numerical-control (NC) unit, so that a desired cut is formed in the workpiece.

A traveling-wire electroerosion machine is generally and commonly required to machine a number of cuts or contours in a workpiece or similar workpieces in a sequence of operations. In each operation, it is necessary that machining should start with a through-hole preformed at a given point associated with each contour desired. Thus, prior to proceeding with any given machining operation, the wire electrode must be threaded or set through a starting through-hole and, subsequent to accomplishment of such machining operation, the wire electrode must after removal from the machined contour or the hole be again threaded or reset through another preformed starting through-hole associated with another contour to be machined in the same or another workpiece. Each resetting operation needed after a given machining operation and before another therefore requires breaking, at a region immediately above or below the workpiece, the electrode wire extending continuously between the supply and takeup sides, re-aligning the relative position between the said axis of the electrode wire and the worktable carrying the workpiece or workpieces, threading a broken end portion of the electrode wire through the starting through-hole associated with the contour to be machined, and then reloading the threaded electrode wire in the wire axial drive or transportation means downstream of the downstream guide member to re-establish its continuous axial travel from the supply side to the collection side.

In order to eliminate the necessity for the operator's manual intervention, an automatic wire resetting arrangement has advantageously been provided which is designed to execute the foregoing wire resetting operation automatically. For such prior art, reference may be made to U.S. Pat. Nos. 3,891,819 and 3,987,270. With known setup arrangements, however, a difficulty on threading arises due to the extreme thinness (e.g. less than 0.5 mm thickness) of the electrode wire and the consequential poor self-supporting ability of the wire. As a matter of practice, thus, it has been found that very often an electrode wire is deflected prior to entry into a small starting through-hole or otherwise is caught on a wall portion of the through-hole and also even on a wall portion of a guide member for guidingly accepting the electrode wire.

OBJECTS OF THE INVENTION

It is therefore an important object of the present invention to provide a novel and improved method of automatically setting or resetting a machining-electrode wire in an operating set-up on a traveling-wire electroerosion machine in which threading or passing the electrode wire through a workpiece is automatically achieved without fail.

Another important object of the invention is to provide a novel and improved apparatus for automatically setting or resetting a machining-electrode wire in an operating set-up on a traveling-wire electroerosion machine, which apparatus is capable of automatically threading the electrode wire through a workpiece without fail and is capable of achieving a given machining operation with an increased efficiency.

SUMMARY OF THE INVENTION

According to the present invention there is provided in a first aspect thereof a method of automatically setting or resetting a machining-electrode wire in an operating set-up on a traveling-wire electroerosion machine having a pair of machining guide members defining therebetween a straight line path for the electrode wire and drive means for axially displacing the electrode wire along the straight line path between wire supply means and wire takeup means, which method comprises the steps of: (a) positioning a workpiece with a preformed straight through-hole between the machining guide members to locate the through-hole in alignment with the straight line path; (b) disposing ahead of one of the guide members and spacedly juxtaposed with the through-hole of the workpiece, a broken free end portion of the electrode wire extending in alignment with the straight line path and leading to one of the supply means and the takeup means; (c) vibrating the free end portion of the electrode wire with a small amplitude; (d) threading the vibrated free end portion of the electrode wire by automatically advancing it into, through and out of the through-hole towards the other of the guide members by the drive means; and (e) thereafter establishing a continuous stretch constituted at least in part by the threaded electrode wire between the supply means whereby to enable it the takeup means and to be continuously renewed from the supply means and collected onto the takeup means for electroerosion-machining of the workpiece.

Specifically, in step (b) the broken free end portion of the electrode wire may extend from the supply means and may be disposed ahead of the said one guide member located on the side of the supply means relative to the workpiece. In step (d), the vibrated free end portion of the electrode wire may be advanced by the drive means through the through-hole and then passed through the said other guide member located on the side of the takeup means automatically to reach the latter, thereby establishing the continuous stretch of step (e).

Alternatively, in step (b), the broken free end portion of the electrode wire may extend from the takeup means and may be disposed ahead of the said one guide member located on the side of the takeup means relative to the workpiece, and in step (d), the vibrated free end portion of the electrode wire is advanced automatically by the drive means through the through-hole towards the said other guide member located on the side of the supply means. The method may, then further comprise: (f) disposing ahead of the said other guide member and spacedly juxtaposed with the through-hole of the workpiece, a second broken free end portion of electrode wire extending in alignment with the said straight line path and leading to the supply means, and (g) connecting the threaded, first-mentioned free-end portion of electrode wire with the second free end portion of electrode wire between the said other guide member and the workpiece to establish the continuous stretch of electrode wire of step (e).

The method of automatically resetting the machining-electrode wire on an operating set up on the traveling-wire electrode wire may include, prior to step (a), breaking a continuous electrode wire threaded through a different preformed straight through-hole in the workpiece between the guide members and stretched between the supply means and the takeup means at a location between the one or other of the guide members and the workpiece to provide the broken free end portion from a first broken half of the continuous electrode wire and to provide a second broken half of the continuous electrode wire. In step (b) of this method, the broken free end portion of the electrode wire constituted by the first broken half of the continuous electrode wire may extend from the supply means and may be disposed ahead of the said one guide member located on the side of the supply means relative to the workpiece, and in step (d), the vibrated free end portion of the electrode wire may be advanced automatically by the drive means through the through-hole and passed through the said other guide member located on the side of the takeup means to reach the latter, thereby establishing the continuous stretch of step (e). Alternatively, in step (b), the broken free end portion of electrode wire constituted by the first broken half of the said continuous electrode wire may extend from the takeup means and may be disposed ahead of the said one guide member located on the side of the takeup means relative to the workpiece and in step (d), the vibrated free end portion of the electrode wire may be advanced automatically by the drive means through the first-mentioned through-hole towards the said other guide member located on the side of the supply means.

The invention also provides in a second aspect thereof an apparatus for automatically setting or resetting a machining-electrode wire in an operating set-up on a traveling-wire electro-erosion machine, which apparatus comprises: a pair of machining guide members in the machine for defining therebetween a straight line path for the electrode wire; drive means in the machine for axially displacing the electrode wire along the straight line path between wire supply means and wire takeup means; means for positioning a workpiece with a preformed straight through-hole between the machining guide members and locating the through-hole in alignment with the said straight line path; means for disposing ahead of one of the guide members and spacedly juxtaposed with the through-hole of the workpiece, a broken free end portion of the electrode wire extending in alignment with the straight line path and leading to one of the supply means and the takeup means; vibrator means for vibrating the free end portion of the electrode wire with a small amplitude; wire-advancing means associated with the drive means for threading the vibrated free end portion of the electrode wire automatically by advancing it into, through and out of the through-hole towards the other of the guide members so as to permit a continuous stretch constituted at least in part by the threaded electrode wire to be established between the supply means and the takeup means and thereafter to be continuously renewed from the supply means and collected onto the takeup means by said drive means for electroerosion-machining of the workpiece.

The apparatus may further comprise breaking means for breaking a continuous electrode wire threaded through a different preformed straight through-hole in the workpiece between the guide members and the workpiece to provide the broken free end portion of the electrode wire from a first broken half of the continuous electrode wire and to provide a second broken half of the continuous electrode wire.

When the continuous electrode wire is to be broken by the breaking means between the workpiece and the said other guide member located on the side of the supply means, the second broken half of the continuous electrode may provide a second broken free end portion and may extend to the supply means via the said guide member. The wire-advancing means may then be adapted for driving the first broken half of the continuous electrode wire to remove the first broken free end portion out of the said different preformed through-hole for positioning it between the workpiece and the said one guide member located on the side of the takeup means while holding the second broken free end portion to be disposed between the workpiece and the said other guide member. The apparatus preferably include connecting means for connecting intermediate between the other guide member and the workpiece, the first broken half threaded through the first-mentioned through-hole with the second broken half having the second broken free end portion disposed between the workpiece and the other guide member.

When the continuous electrode wire is to be broken by the breaking means between the workpiece and the one guide member located on the side of the takeup means, the second broken half of the continuous electrode wire may provide a second broken free end portion and may extend to the supply means via the said other guide member. The wire-advancing means may then be adapted for driving the second broken half of the continuous electrode wire to remove the second broken free end portion out of the said different preformed through-hole for positioning it between the workpiece and the other guide member located on the side of the supply means while holding the first broken free end portion to be disposed between the workpiece and the one guide member. In that case the apparatus preferably includes connecting means for connecting between the said other guide member and the workpiece, the first broken half threaded through the first-mentioned through-hole with the second broken half having the second broken free end portion disposed between the workpiece and the other guide member.

BRIEF DESCRIPTION OF THE DRAWING

These and other objects and features of the invention as well as advantages thereof will become more readily apparent from the following description taken with reference to the accompanying drawing in which.

SPECIFIC DESCRIPTION

Figure 1:
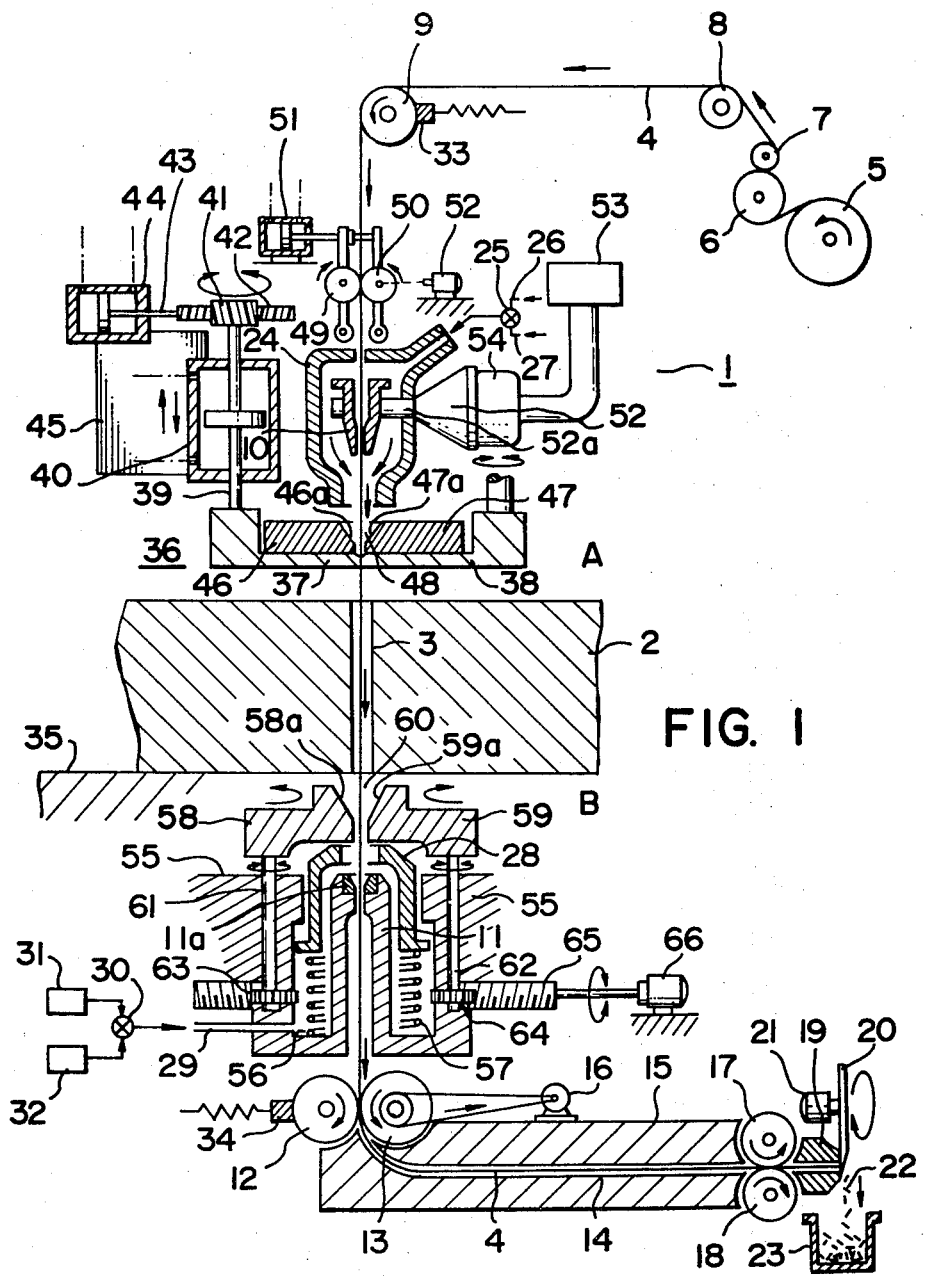
FIG. 1 is a schematic view essentially in elevational section of an apparatus embodying the present invention.

Referring now to FIG. 1, an automatic wire-setting and wire-resetting apparatus 1 according to the invention is shown arranged across the opposite sides A and B of a workpiece 2 having a straight starting through-hole 3 preformed therein. The arrangement shown illustrates the state in which the machining-electrode wire 4 which has automatically been threaded through the starting hole 3 of the workpiece 2 is axially transported for the electroerosive machining of the workpiece 2. The electrode wire 4 is transported from a supply reel 5 via guide rollers 6, 7, 8 and 9, through an upper machining guide member 10, the workpiece 2 and a lower machining guide member 11 and, in turn, via a pair of drive rollers 12 and 13 into a takeup passage 14 in a block 15. The drive rollers 12 and 13 are in abutting and squeezing engagement with the electrode wire 4 and, with the roller 13 driven by a motor 16, are rotated to axially draw and drive the electrode wire 4. The electrode wire 4 issuing from the drive rollers 12 and 13 is guided through the passage 14 in the block 15 and in turn passed between a pair of takeup rollers 17 and 18 driven by a motor (not shown). A nozzle 19 is provided at the outlet side of the take-up rollers 17 and 18 to feed the electrode wire 4 to a cutting blade 20 rotated by a motor 21 so that it is cut-up into wire pieces 22. The wire pieces 22 are fed down into a receptacle 23 for disposal. The roller 6 on the wire supply side is rotated to apply a braking force and hence an appropriate tension to the electrode wire 4.

The upper and lower guide members 10 and 11 provide a straight line path for the electrode wire 4 therebetween and for positioning the electrode wire 4 or the said path in a machining relationship with the workpiece 2. The guide members 10 and 11, especially the one at the lower or downstream side, have sapphire guide elements anchored therein as shown at 11a. The guide member 10 at the upstream side is shown arranged in a nozzle assembly 24 which is open towards the workpiece 2 and which communicates via a valve 25 with a source of liquid machining medium 26, e.g. distilled water, to deliver the machining medium into the cutting region in the workpiece 2. A source of compressed blasting air 27 which will be described later is also connected to the valve 25. The guide member 11 at the downstream side is also arranged in a nozzle assembly, designated at 28, which is open towards the workpiece 2 and which communicates via an inlet 29 and a valve 30 with a source 31 of the liquid machining medium to deliver the machining medium into the cutting region in the workpiece 2. A source 32 of compressed blasting air which will be described later is also connected to the valve 30.

The electrically conductive guide roller 9 at the upstream side and the guide roller 12 at the downstream side have brushes 33 and 34 in contact therewith, respectively. The brushes 33 and 34 are connected to one output terminal of an electroerosion power supply (not shown) which has its other output terminal electrically connected to the workpiece 2 to apply an electroerosion machining current between the electrode wire 4 and the workpiece 2 across the machining gap flooded with the liquid machining medium, thereby electroerosively removing material from the workpiece 2. The latter is securely supported on a worktable 35 which is displaced horizontally or in an X—Y plane to move the workpiece 2 relative to the electrode wire traveling continuously between the machining guide members 10 and 11 along the straight line path. The workpiece 2 is moved relative to the straight line path or the axis of the electrode wire between the machining guide members 10 and 11 by means of a pair of motors (not shown) designed to displace the worktable 35 along the X-axis and Y-axis, respectively. The motors are fed with drive signals furnished from a command source, i.e. a numerical-control (NC) unit having data preprogrammed therein to move the workpiece 2 relative to the electrode wire along a predetermined path or trajectory in accordance with a desired contour to be machined in the workpiece 2.

Prior to or subsequent to a given electroerosion machining operation effected in the foregoing manner, the electrode wire 4 must be threaded through the preformed starting through-hole 3. Subsequent to such an electroerosion operation, it is necessary to break continuous electrode wire 4 stretched between the supply reel 5 and the takeup rollers 17, 18 and threaded through the through-hole 3 at a location between the workpiece 2 and the upstream guide member 10 or the downstream guide member 11. To this end, a breaking assembly 36 is provided or brought into operating position between the upstream machining guide member 10 and the workpiece 2 in the embodiment shown and is constructed and operates in the manner to be described. Prior to breaking the continuous electrode wire and subsequent to a previous traveling-wire electroerosion machining operation (which is completed with) the electrical disconnection of the electroerosion power supply from the workpiece 2 and the electrode wire (4), the halting of the machining feed displacement of the worktable 35, the halting of the axial drive of the continuous electrode wire 4 and the terminating of the supply of the liquid machining medium onto the workpiece 2 through the nozzles 24 and 28, it is advantageous to strip off any residue of the liquid machining medium that remains adherent to the electrode wire 4. To this end, the valves 25 and 30 are switched to connect the sources 27 and 32 of compressed blasting air or any other suitable gas to the nozzles 24 and 28 to allow air or gaseous blasts to be applied to the electrode wire located between the machining guide members 10 and 11 and passing through the preformed hole (3) used in the previous machining operation.

The wire-breaking assembly 36 comprises a pair of cutting blades 37 and 38. The blade 37 is shown carried via a linkage (not shown) by a piston rod 39 of a hydraulic or pneumatic cylinder 40 secured to a frame (not shown) while the blade 38 is similarly carried and coupled with such a cylinder (not shown) secured to the same frame. The upper portion of the piston rod 39 has a pinion 41 secured thereto in mesh with a rack 42 which is carried by a piston rod 43 of a hydraulic or pneumatic cylinder 44 secured to a bracket 45. Thus, the vertical position of the blade 37 is determined by the cylinder actuator arrangement 40 and its angular position by the cylinder arrangement 44. It will be noted that a similar arrangement not shown is provided which operates the piston rod for the blade 38. During a traveling-wire electroerosion machining operation, the blades 37 and 38 are placed in their respective angular positions in which they are out of mutual engagement. For the wire-breaking operation, the vertical positions of the cutting blades 37 and 38 are first shifted to locate their planes so as to intersect the electrode wire 4 at a desired breaking position. Then the blades are rotated so as to be brought together to break the continuous wire at the desired position and to divide it into an upstream broken half and a downstream broken half. The traction rollers 12 and 13 are then driven to feed the downstream broken half into the collecting zone and to allow it to be disintegrated into pieces for reception by the receptacle 23. Prior to breaking, it is advantageous to heat the electrode wire 4 stretched between the guide rollers 9 and 12 while a sufficient tension is applied thereto. To this end, the guide rollers 9 and 12 may be energized by an electrical heating current furnished via the brushes 33 and 34 from a heating current supply which is provided separately from the electroerosion machining power supply. When the wire 4 is broken, the cutting blades are angularly retracted by operating the cylinder arrangements (44) to withdraw their cutting edges from the straight line path between the machining guide members 10 and 11 and may further in addition be shifted upwards by operating the cylinder arrangements (40).

Subsequent to the wire-breaking operation, the worktable 35 is displaced under the command of the NC unit to position the workpiece 2 so as to locate a new machining-start straight through-hole in alignment with the straight line path defined between the machining guide members 10 and 11, i.e. in alignment with the longitudinal axis of the free end portion of the upstream broken half of wire 4 projecting from the upper machining guide member 10 and then a wire-threading operation for the new through-hole may be initiated.

Shown disposed flush above the cutting blades 37 and 38, respectively, are a pair of plates 46 and 47 which are carried by a pair of mobile assemblies (not shown), respectively, which are similar to the assemblies (39-44) for the blades 37 and 38, respectively. The plates 46 and 47 have, at their portions corresponding to the edge portions of the blades 37 and 38, tapered semi-circular surface formations 46a, respectively, which are designed, when they are brought together, to form a tapered circular hole 48 which constitutes a threading guide hole coaxial with the straight line path provided between the machining guide members 10 and 11. The plates 46 and 47 are normally held retracted angularly during the electroerosion operation and are brought together to form the tapered circular or guide hole 48 for the wire-threading operation. Of course, it will be understood that more than two such plates may be used to produce the guide hole 48. It is also possible to bring the plates 46 and 47 together or into their operating positions prior to the wire-breaking operation.

Disposed also at the upstream side A of the workpiece 2 and between the guide roller 9 and the upper machining guide member 10 and a pair of drive rollers 49 and 50 which are brought into engagement with the electrode wire 4 by the cylinder actuator arrangement 51 selectively for the wire-threading operation. One of these rollers in engagement with the electrode wire 4, say the roller 50, is rotated by a motor 52 to draw the upstream broken half of wire 4 off the supply reel 5 and to rotate the other roller 49. The rotation of the rollers 49 and 50 allows the wire to be advanced and the broken free end portion thereof projecting from the upstream guide member 10 to be guided through the guide hole 48 and to be threaded into and through the preformed straight through-hole 3 in the workpiece 2.

In accordance with an important feature of the present invention, the apparatus also includes wire-vibrating means which is here embodied by a vibrator 52 energized by a power supply 53. The vibrator 52 has its tip portion 52a attached to the machining guide member 10 to vibrate the free end portion of wire 4 with a small amplitude transversely to the axis thereof. The vibrator 52 may be of a conventional truncated horn structure having the tip 52a and an electromechanical transducer 54 attached to the horn body at its end of greater cross section and energized by the high-frequency power supply 53. Ultrasonic vibrations at a frequency, say, between 1 kHz and 50 kHz, are generated in the transducer and are amplified and propagated through the horn body and are imparted via the guide member to the advancing wire electrode 4 to vibrate the free end thereof with a small amplitude, say between 1 and 100 $\mu$m.

Downstream of the straight through-hole 3, the lower machining guide member 11 is provided as described previously and constructed integrally with a frame or frames 55. Disposed within a compartment 56 defined by the outer walls of the guide member 11 and the inner walls of the frame 55 is a helical spring 57 which supports the fluid delivery nozzle 28. Shown disposed above the nozzle 28 is a pair of blocks 58 and 59 which have tapered semi-circular surface formations 58a and 59a designed, when the blocks are rotated into the positions shown, to form a tapered circular hole 60 which constitutes a threaded-wire reception hole coaxial with the straight line path between the machining guide members 10 and 11. The blocks 58 and 59 are supported by stems 61 and 62 which terminate with gears 63 and 64, respectively, which are in mesh with a worm 65 which is bi-directionally rotable by a motor 66. It will be understood that during the traveling-wire electroerosion machining operation, the blocks 58 and 59 are placed in their angular positions in which they are out of mutual engagement. For the wire-threading operation, the motor 66 is rotated clockwise to bring the blocks 58 and 59 into their operating positions is shown to establish the threaded-wire reception hole 60 while causing the nozzle unit 28 to be retracted downwards against the force of spring 57. The hole 60 is tapered convergently upwards as shown.

It has been found that the vibration of the free end portion of wire electrode 4, especially via the guide member 10, in accordance with the present invention, allows this portion projecting from the guide member 10 to be smoothly guided through the guide hole 48, to be smoothly threaded into, through and out of the performed through-hole 3 in the workpiece 2, and then to be smoothly guided through the reception hole 60 and thence into and through the machining guide member 11, without catching on any wall portion of the passage. This contrasts favorably with existing wire threading arrangements, in which catching on such wall portions has often occurred. It will be apparent that the vibration effectively reduces the contact frictional resistance of the free end portion with the wall portions of the threading and guiding passages. At this stage, the rollers 12 and 13 may be rotationally driven by the motor 16. When the threaded free end portion of wire becomes caught between the drive rollers 12 and 13 and fed towards and between the takeup rollers 17 and 18, a continuous stretch of wire electrode is reestablished between the supply side (5) and the takeup side (12, 13, 14, 17, 18) and so allows a subsequent traveling-wire electroerosion operation to be initiated. At this state, the motor 66 is driven counterclockwise to cause each of the blocks 58 and 59 to be angularly displaced via its stem 61, 62, gear 63, 54 and worm 65. This allows the nozzle unit 28 to move upwards under the force of spring 57 and to locate the nozzle opening immediately below the workpiece 2. The power supply 53 is also turned off when the free end portion of wire is caught between the rollers 12 and 13. The threading guide plates 46 and 47 are also retracted from positions shown. The blasting air may remain applied from the nozzle 24 to the threading wire throughout the threading operation and in this case is now terminated by closing the valve 25.

It will be understood that the breaking unit 36 may, instead of the arrangement shown, be positioned to locate the cutting blades 37 and 38 at a position between the workpiece 2 and the threaded-wire reception guide hole 60 or the downstream machining guide member 11 to allow the continuous wire to be broken at that position. In this case, the upstream broken half of wire is removed from the through-hole 3 by bringing the rollers 49 and 50 into the operating position shown and driving these rollers to rotate in the direction opposite to the direction shown until the broken free end of this half is located immediately below the upstream machining guide member 10 or the threading guide hole 48 while the downstream broken half is removed via the takeup passage 14 out of the system by driving the traction rollers 12 and 13 and the takeup rollers 17 and 18. Upon repositioning the workpiece 2 to locate a new starting through-hole (3) in alignment with the straight line path between the machining guide members 10 and 11, the broken free end portion is threaded into, through and out of the new starting through-hole in the manner described.

Figure 2:
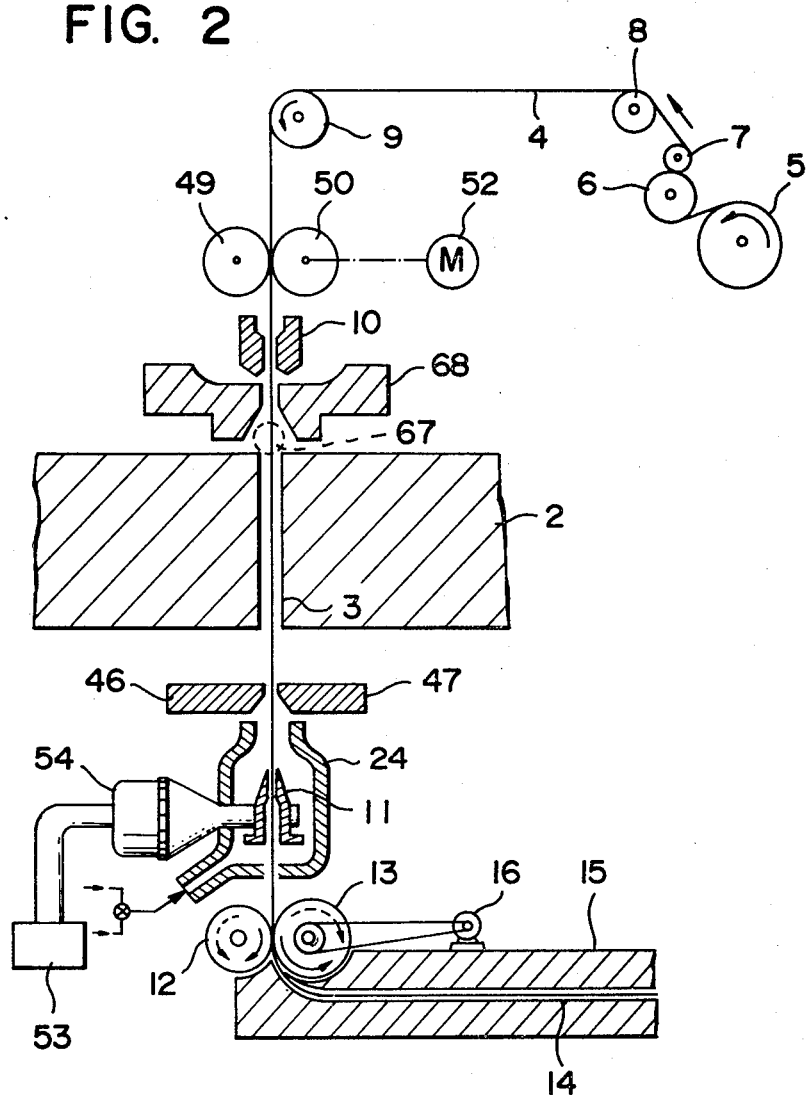
FIG. 2 is a similar view schematically illustrating another embodiment of the apparatus of the present invention.

FIG. 2 shows a modified embodiment according to the invention. In this embodiment, the vibrator unit 54 is arranged associated with the downstream machining guide member 11 in the nozzle assembly 24. Wire-breaking is achieved at a location between the workpiece 2 and the upstream machining guide 10 by a breaking and connecting unit 67 in a guide assembly 68. After the breaking of a continuous electrode wire, the upstream broken half remains stationary while the downstream broken half is driven forwards until its free end portion is located below the workpiece 2 and immediately above a threading guide element 47 or the downstream machining guide member 11 in the nozzle 24. The workpiece 2 is then repositioned to locate a new starting through hole (3) in alignment with the straight line path between the machining guide members 10 and 11. Thereafter, the rollers 12 and 13 are driven in the directions indicated by the broken arrows by the motor 16 to advance the broken free end portion into, through and out of the new starting through-hole while vibrating the free end portion by means of vibrator 54. When the upper broken free end portion and the lower broken free end portion are brought together, they are united by the breaking and connecting unit 67 to reestablish a continuous stretch of wire extending between the supply side (5, 6, 7, 8, 9) and the takeup side (12, 13, 14) as shown.

In the arrangement of FIG. 2, the rollers 49 and 50 are operated when the breaking and connecting unit 67 is divided into a single-function breaking unit and a single-function connecting unit located between the workpiece 2 and the threading guide 47 or the lower machining guide member 11 and between the workpiece 2 and the upper machining guide member 10, respectively. After breaking of a continuous electrode wire, the upstream broken half is retracted and removed from the through-hole 3 by driving the rollers 49 and 50 by means of the motor 52 until its free end portion is located between the upper machining guide member 10 and the workpiece 2. The workpiece 2 is then repositioned to locate a new starting through-hole (3) therein in alignment with the straight line path defined between the machining guide members 10 and 11. Thereafter, the rollers 12 and 13 are driven in the directions indicated by the broken arrow by the motor 16 to advance the free end portion of downstream broken half into, through and out of the new starting through-hole while vibrating the free end portion by means of the vibrator 54. When the upper broken free end portion and the lower broken free end portion are brought together, they are united (e.g. by welding) by the connecting unit located between the workpiece 2 and the upper machining guide member 10 to reestablish a continuous stretch of wire extending between the supply side (5, 6, 7, 8) and the takeup side (12, 13, 14) as shown. The the rollers 49 and 50 may now be disengaged from the electrode wire.

What is claimed is:

1. A method of automatically setting or resetting a machining electrode wire in an operating set-up on a traveling-wire electroerosion machine having a pair of guide members defining therebetween a straight line path for the electrode wire and drive means for axially displacing the electrode wire along the straight line path between wire supply means and wire takeup means, the method comprising the steps of:
   (a) positioning a workpiece with a preformed straight through-hole between said guide members to locate said through-hole in alignment with said straight line path;
   (b) disposing ahead of one of said guide members and spacedly juxtaposed with said through-hole of the workpiece, a broken free end portion of the electrode wire extending in alignment with said straight line path and leading to one of said supply means and said takeup means;

(c) vibrating said free end portion of the electrode wire with a small amplitude by imparting mechanical vibrations to said one guide member;

(d) threading said vibrating free end portion of the electrode wire by automatically advancing it into, through and out of said through-hole towards the other of said guide members by said drive means; and (e) thereafter establishing a continuous stretch constituted at least in part by said threaded electrode wire between said supply means and said takeup means whereby to enable it to be continuously renewed from said supply means and collected onto said takeup means for electroerosion-machining of said workpiece.

2. The method defined in claim 1 wherein in step (b), said broken free end portion of the electrode wire extends from said supply means and is disposed ahead of said one guide member located on the side of said supply means relative to said workpiece.

3. The method defined in claim 2 wherein in step (d), said vibrating free end portion of the electrode wire is advanced by said drive means through said through-hole and passed through said other guide member located on the side of said takeup means automatically to reach the latter, thereby establishing said continuous stretch of step (e).

4. The method defined in claim 1 wherein in step (b), said broken free end portion of the electrode wire extends from said takeup means and is disposed ahead of said one guide member located on the side of said takeup means relative to said workpiece, and wherein in step (d), said vibrating free end portion of the electrode wire is advanced automatically by said drive means through said through-hole towards said other guide member located on the side of said supply means, said method further comprising:

(f) disposing ahead of said other guide member and spacedly juxtaposed with said through-hole of the workpiece, a second broken free end portion of electrode wire extending in alignment with said straight line path and leading to said supply means, and (g) connecting said threaded first-mentioned free end portion of electrode wire with said second free end portion of electrode wire between said other guide member and said workpiece to establish said continuous stretch of electrode wire of step (e).

5. The method defined in claim 1, further comprising: prior to step (a), the step of (h) breaking a continuous electrode wire passing through a different preformed straight through-hole in said workpiece between said guide members and stretched between said supply means and said takeup means at a location between said one or other of said guide members and said workpiece to provide said broken free end portion of the electrode wire from a first broken half of said continuous electrode wire and to provide a second broken half of said continuous electrode wire.

6. The method defined in claim 5 wherein in step (b), said broken free end portion of the electrode wire constituted by said first broken half of said continuous electrode wire extends from said supply means and is disposed ahead of said one guide member located on the side of said supply means relative to said workpiece and wherein in step (d), said vibrating free end portion of the electrode wire is advanced automatically by said drive means through said through-hole and passed through said other guide member located on the side of said takeup means to reach the latter, thereby establishing said continuous stretch of step (e).

7. The method defined in claim 6 wherein in step (h), said continuous electrode wire is broken between said workpiece and said one guide member located on the side of said supply means, said method further comprising: prior to step (a) and subsequent to step (h), removing, by means of said drive means, said second broken half of the continuous electrode wire from said different preformed through-hole and through said other guide member into said takeup means for disposal.

8. The method defined in claim 6 wherein in step (h), said continuous electrode wire is broken between said workpiece and said other guide member located on the side of said takeup means, said method further comprising: prior to step (a) and subsequent to step (h), retracting, by means of said drive means, said first broken half of the continuous electrode wire out of said different preformed through-hole to locate said broken free end portion between said one guide member and said workpiece and removing said second broken half of the continuous electrode wire through said other guide member into said takeup means for disposal.

9. The method defined in claim 5 wherein in step (b), said broken free end portion of the electrode wire constituted by said first broken half of said continuous electrode wire extends from said takeup means and is disposed ahead of said one guide member located on the side of said takeup means relative to said workpiece and wherein in step (d), said vibrating free end portion of the electrode wire is advanced automatically by said drive means through said first-mentioned through-hole towards said other guide member located on the side of said supply means.

10. The method defined in claim 9 wherein in step (h), said continuous electrode wire is broken between said workpiece and said other guide member located on the side of said supply means and wherein said second broken half of the continuous electrode wire provides a second broken free end portion and extends to said supply means via said other guide member, the method further comprising:

driving said first broken half of the continuous electrode wire to remove said first broken free end portion between said workpiece and said one guide member located on the side of said takeup means while holding said second broken free end portion to be disposed between said workpiece and said other guide member; and connecting intermediate between said other guide member and said workpiece, said first broken half threaded through the first-mentioned through-hole with said second broken half having said second broken free end portion disposed between said workpiece and said other guide member.

11. The method defined in claim 9 wherein in step (h), said continuous electrode wire is broken between said workpiece and said one guide member located on the side of said takeup means and wherein said second broken half of the continuous electrode wire provides a second broken free end portion and extends to said supply means via said other guide member, the method further comprising:

driving said second broken half of the continuous electrode wire to remove said second broken free end portion out of said different preformed through-hole for positioning it between said workpiece and said other guide member located on the side of said supply means while holding said first broken free end portion to be disposed between said workpiece and said one guide member; and connecting intermediate between said other guide member and said workpiece, said first broken half threaded through the first-mentioned through-hole with said second broken half having said second broken free end portion disposed between said workpiece and said other guide member.

12. An apparatus for automatically setting or resetting a machining-electrode wire in an operating set-up on a traveling-wire electroerosion machine, comprising:

a pair of guide members in said machine for defining therebetween a straight line path for the electrode wire;

drive means in said machine for axially displacing the electrode wire along said straight line path between wire supply means and wire takeup means;

means for positioning a workpiece with a preformed straight through-hole between said guide members and locating said through-hole in alignment with said straight line path;

means for disposing ahead of one of said guide members and spacedly juxtaposed with said through-hole of the workpiece, a broken free end portion of the electrode wire extending in alignment with said straight line path and leading to one of said supply means and said takeup means;

vibrator means proximate to said one guide member for imparting mechanical vibrations to said electrode wire to vibrate said free end portion thereof with a small amplitude;

wire-advancing means associated with said drive means for threading said free end portion of the electrode wire automatically by advancing it into, through and out of said through-hole towards the other of said guide members, so as to permit a continuous stretch constituted at least in part by said threaded electrode wire to be established between said supply means and said takeup means and thereafter to be continuously renewed from said supply means and collected onto said takeup means by said drive means for electroerosion-machining of said workpiece.

13. The apparatus defined in claim 12, further comprising: breaking means for breaking a continuous electrode wire threaded through a different preformed straight through-hole in the workpiece between said guide members and stretched between the supply means and takeup means at a location between said workpiece and the one or other of said guide members to provide said broken free end portion from a first broken half of said continuous electrode wire and to provide a second broken half of said continuous electrode wire.

14. The apparatus defined in claim 13, further comprising connecting, means for connecting intermediate between said other guide member and said workpiece, said first broken half and said second broken half, one of which is threaded through the first-mentioned preformed through-hole in said workpiece.

15. The apparatus defined in claim 13, further comprising gas blasting means for applying a blast of gas onto said continuous electrode wire to strip a residue of electroerosion machining liquid medium adherent thereon at least in the region of said location.

16. The apparatus defined in claim 13, further comprising means for heating said continuous electrode wire prior to breaking by said breaking means.

* * * * *